US012221989B2

(12) United States Patent
Cattaneo

(10) Patent No.: US 12,221,989 B2
(45) Date of Patent: Feb. 11, 2025

(54) ACTUATION AND BLOCKING SYSTEM OF A JOINT BETWEEN A SHOULDER AND A SHELF OF A PIECE OF FURNITURE OR OTHER FURNISHING ITEMS

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 776 days.

(21) Appl. No.: 17/286,506

(22) PCT Filed: Oct. 21, 2019

(86) PCT No.: PCT/IB2019/058939
§ 371 (c)(1),
(2) Date: Apr. 19, 2021

(87) PCT Pub. No.: WO2020/084434
PCT Pub. Date: Apr. 30, 2020

(65) Prior Publication Data
US 2021/0355976 A1   Nov. 18, 2021

(30) Foreign Application Priority Data
Oct. 26, 2018  (IT) .................. 102018000009818

(51) Int. Cl.
*F16B 12/20* (2006.01)
*A47B 96/06* (2006.01)

(52) U.S. Cl.
CPC ........ *F16B 12/2063* (2013.01); *A47B 96/066* (2013.01); *Y10S 403/12* (2013.01)

(58) Field of Classification Search
CPC ............... A47B 96/066; F16B 12/2009; F16B 12/2027; F16B 12/2036; F16B 12/2054;
(Continued)

(56) References Cited

U.S. PATENT DOCUMENTS 4,685,848 A * 8/1987 Langer .................... B25B 17/00
411/407
5,090,652 A * 2/1992 Cattaneo .............. A47B 95/008
248/223.41
(Continued)

FOREIGN PATENT DOCUMENTS

EP  2609833 A1 * 7/2013 ........... A47B 96/066
EP  3111804      1/2017
(Continued)

*Primary Examiner* — Josh Skroupa
*Assistant Examiner* — Kevin J Baynes
(74) *Attorney, Agent, or Firm* — Themis Law

(57) ABSTRACT

A joint for use in a piece of furniture or other furnishing item with a shoulder and a shelf, stably interconnected by the joint perpendicularly to each other, is maneuvered with an actuation and blocking system. The joint includes a pin with a fixing element, which becomes at least partially inserted in holes defined in the shoulder and the shelf, the pin having a side hole for receiving a shaped stem that extends from the actuation and blocking group of the joint. The actuation and blocking group has a 90° transmission between a maneuvering point, which is accessible from the front of the furniture, and the shaped stem, which is inserted in the side hole of the pin. Reciprocal retention elements, provided between the pin and the actuation and blocking group, withhold the pin in the hole of the shelf housing the pin.

13 Claims, 12 Drawing Sheets

(58) Field of Classification Search
CPC ...... F16B 12/2063; F16B 12/24; F16B 12/36; F16B 2012/103; F16B 2012/2018; F16B 2012/2045; Y10S 403/10; Y10S 403/12; Y10S 403/13

See application file for complete search history.

(56) References Cited

U.S. PATENT DOCUMENTS

| | | | | |
|---|---|---|---|---|
| 5,292,095 | A * | 3/1994 | Cattaneo | A47B 91/028 248/188.4 |
| 5,785,451 | A * | 7/1998 | Horger | F16B 12/2036 403/245 |
| 6,890,121 | B2 * | 5/2005 | Mauri | F16B 12/2063 403/231 |
| 7,004,455 | B2 * | 2/2006 | Pilja | F16B 23/0061 254/13 |
| 7,824,125 | B2 * | 11/2010 | Dorney | F16B 5/0291 312/265.5 |
| 8,162,561 | B2 * | 4/2012 | Pilja | F16B 12/2063 403/DIG. 12 |
| 10,280,960 | B2 * | 5/2019 | Giovannetti | F16B 12/2027 |
| 10,729,243 | B2 * | 8/2020 | Carnelos | F16B 12/2063 |
| 10,962,037 | B2 * | 3/2021 | Cattaneo | F16B 12/2027 |
| 11,732,739 | B2 * | 8/2023 | Cattaneo | F16B 12/2036 403/362 |
| 2018/0168348 | A1 * | 6/2018 | Carnelos | F16B 12/2063 |

FOREIGN PATENT DOCUMENTS

| | | | |
|---|---|---|---|
| FR | 2151231 A5 * | 4/1973 | ............ F16B 12/14 |
| WO | WO-2009056935 A1 * | 5/2009 | ........... A47B 91/028 |
| WO | 2017001419 | 1/2017 | |
| WO | 2017060298 | 4/2017 | |
| WO | 2018007252 | 1/2018 | |
| WO | 2018007315 | 1/2018 | |
| WO | 2018015090 | 1/2018 | |

* cited by examiner

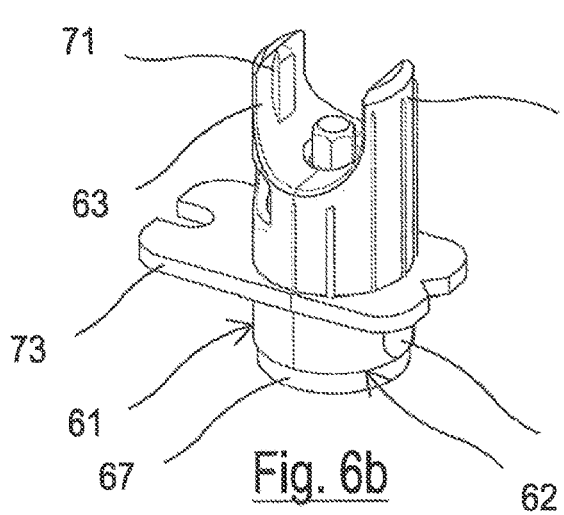
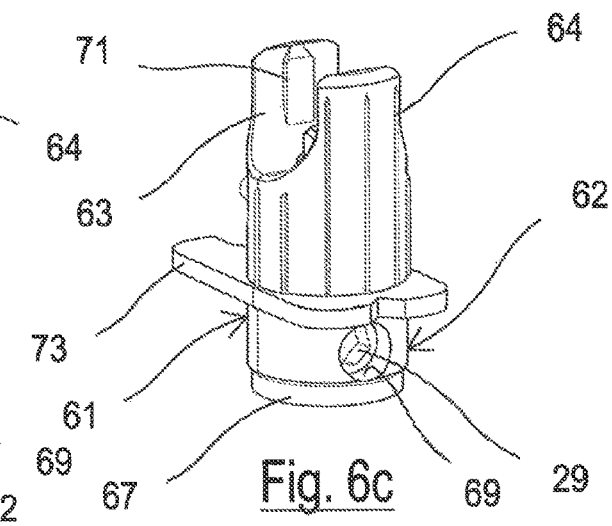
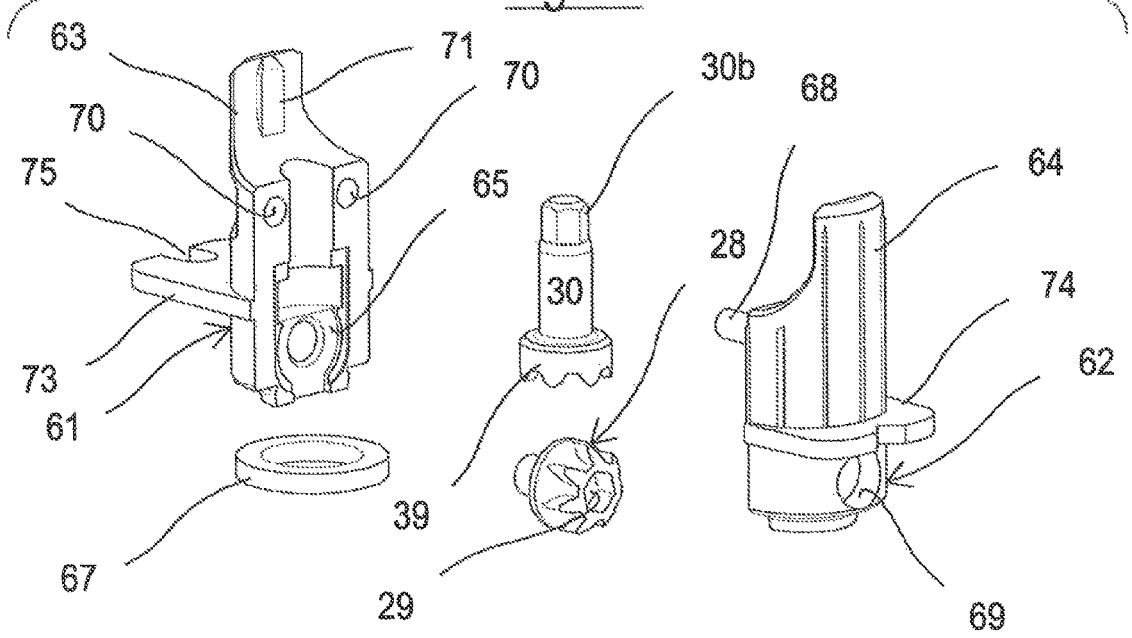
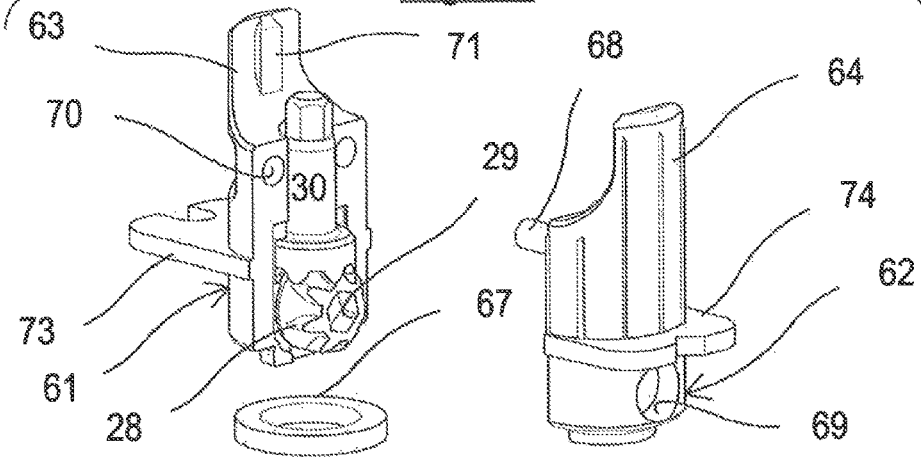

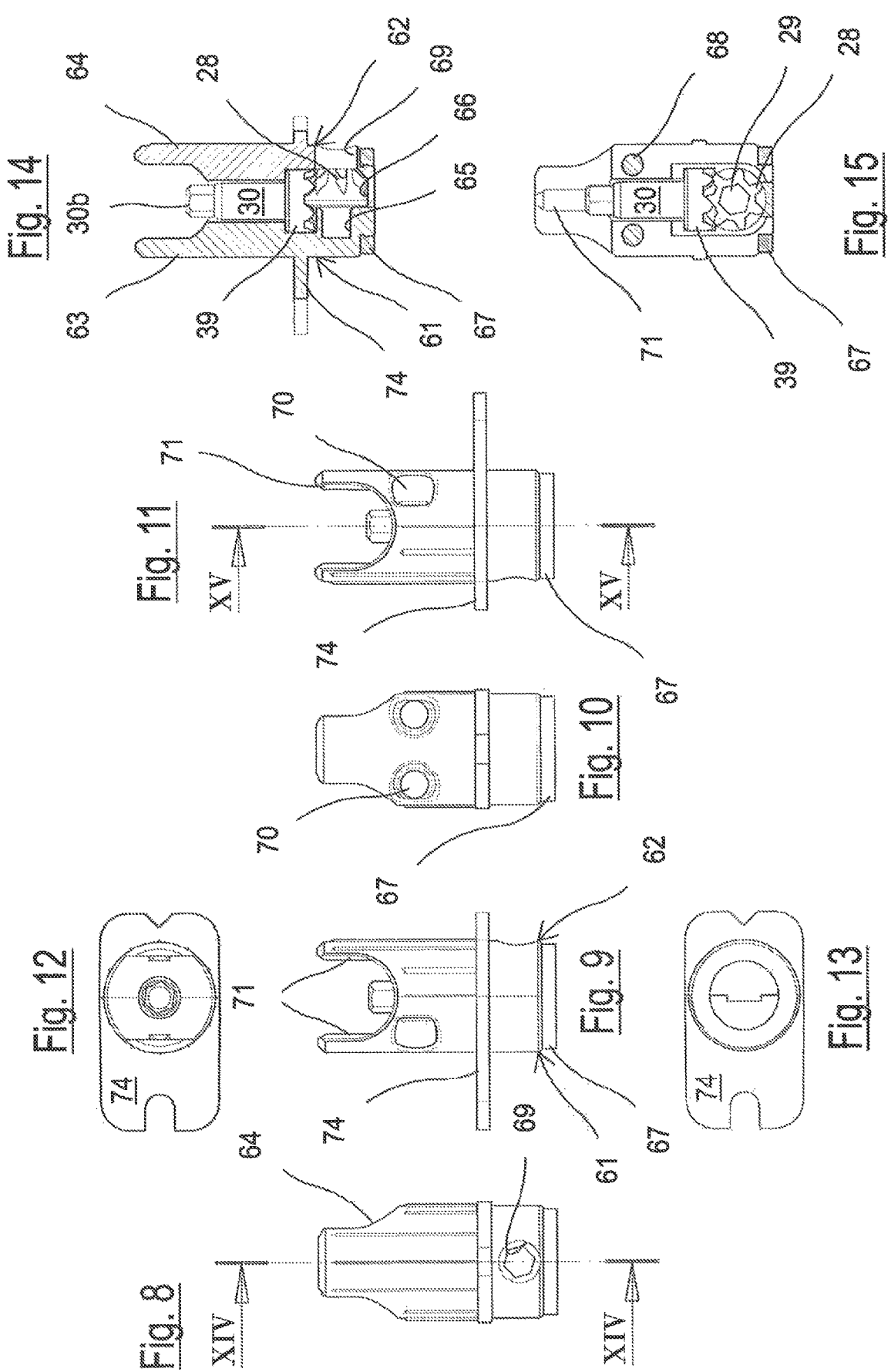

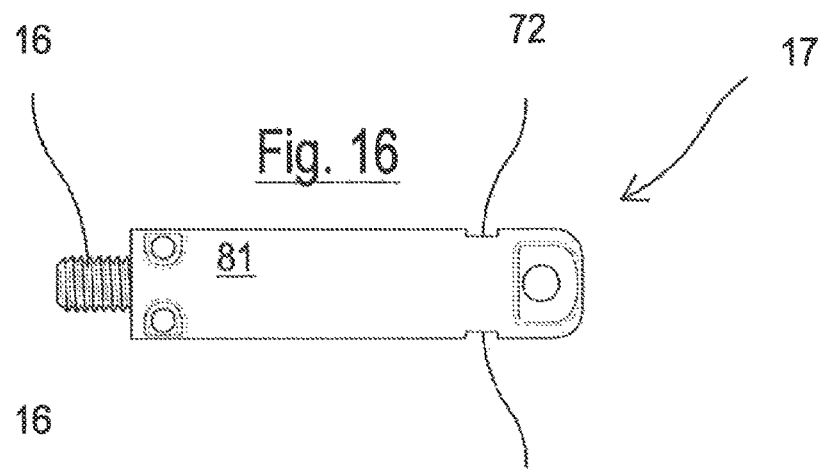
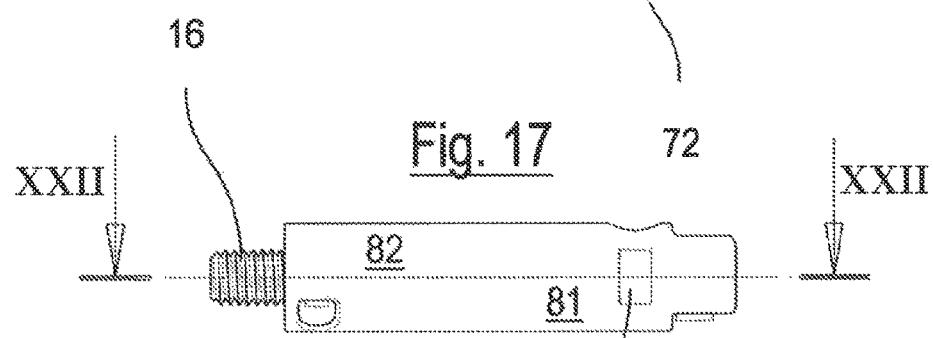
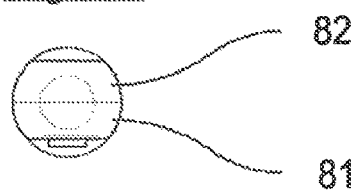
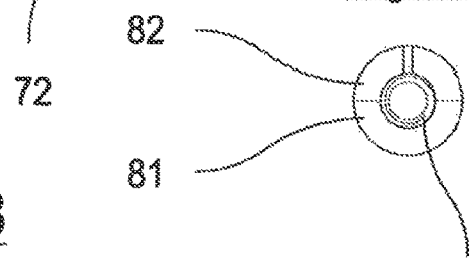
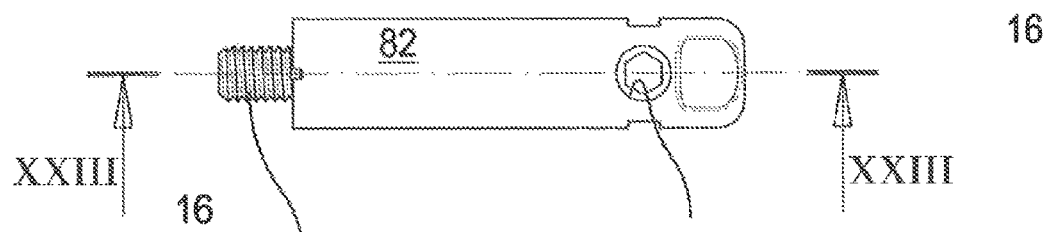
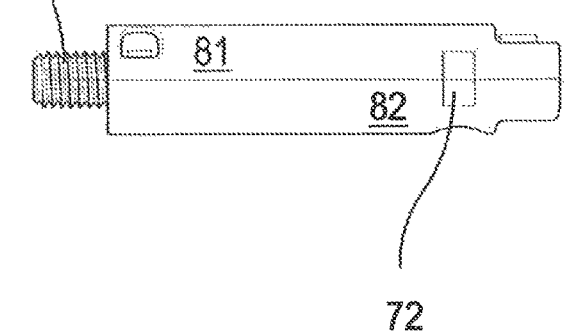

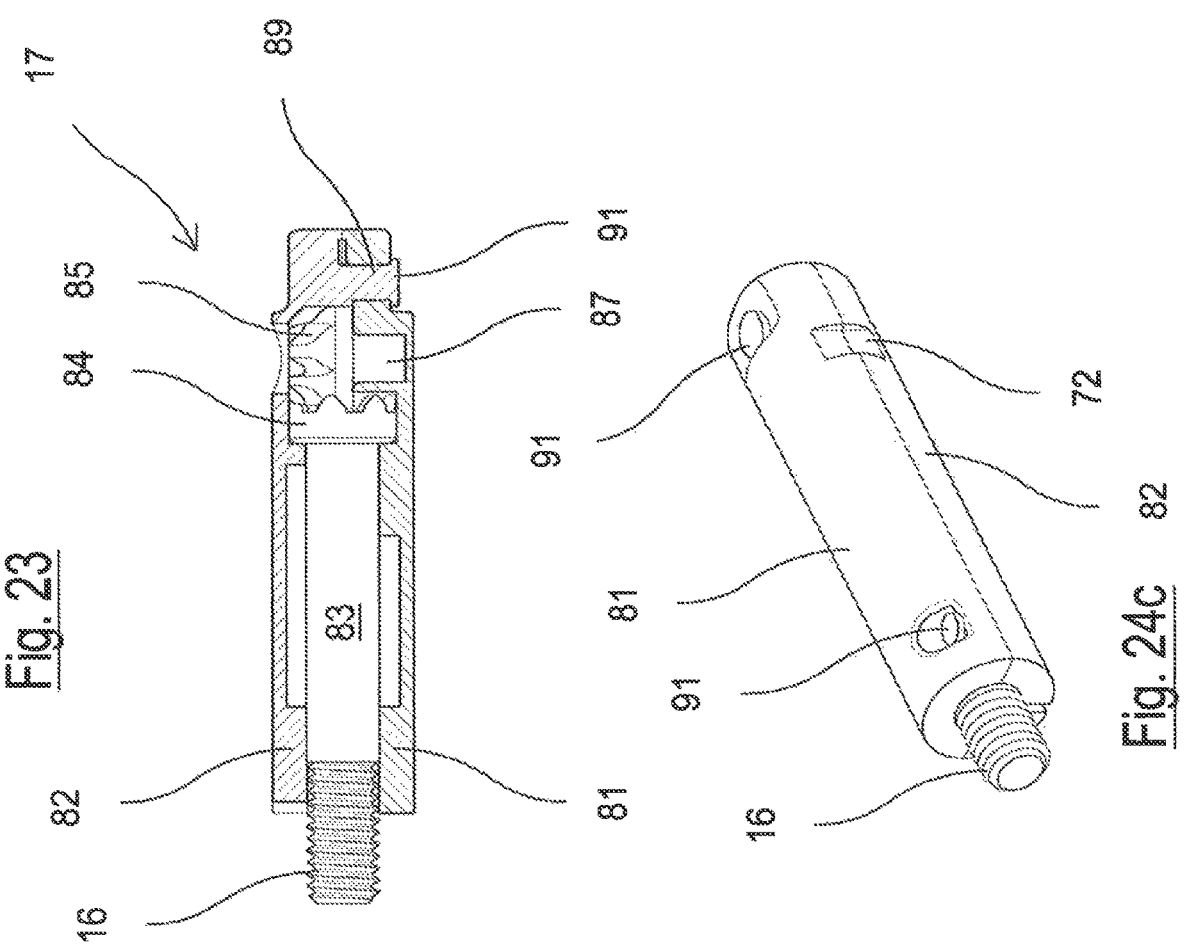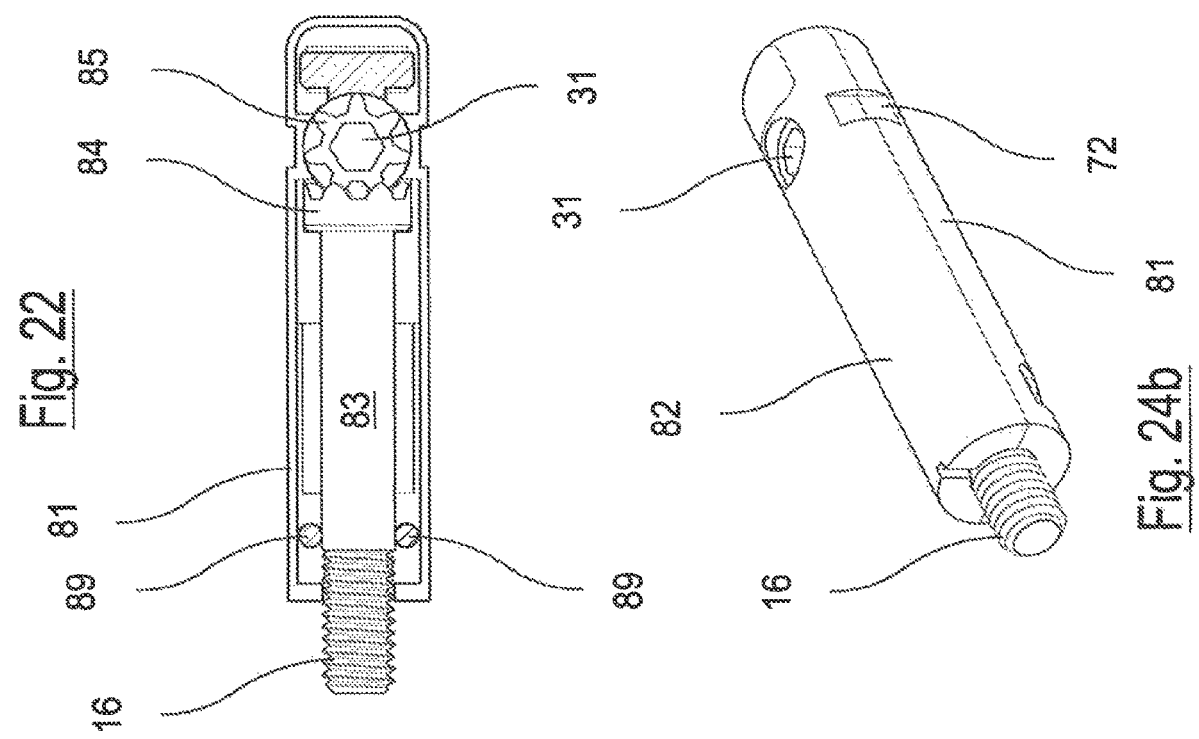

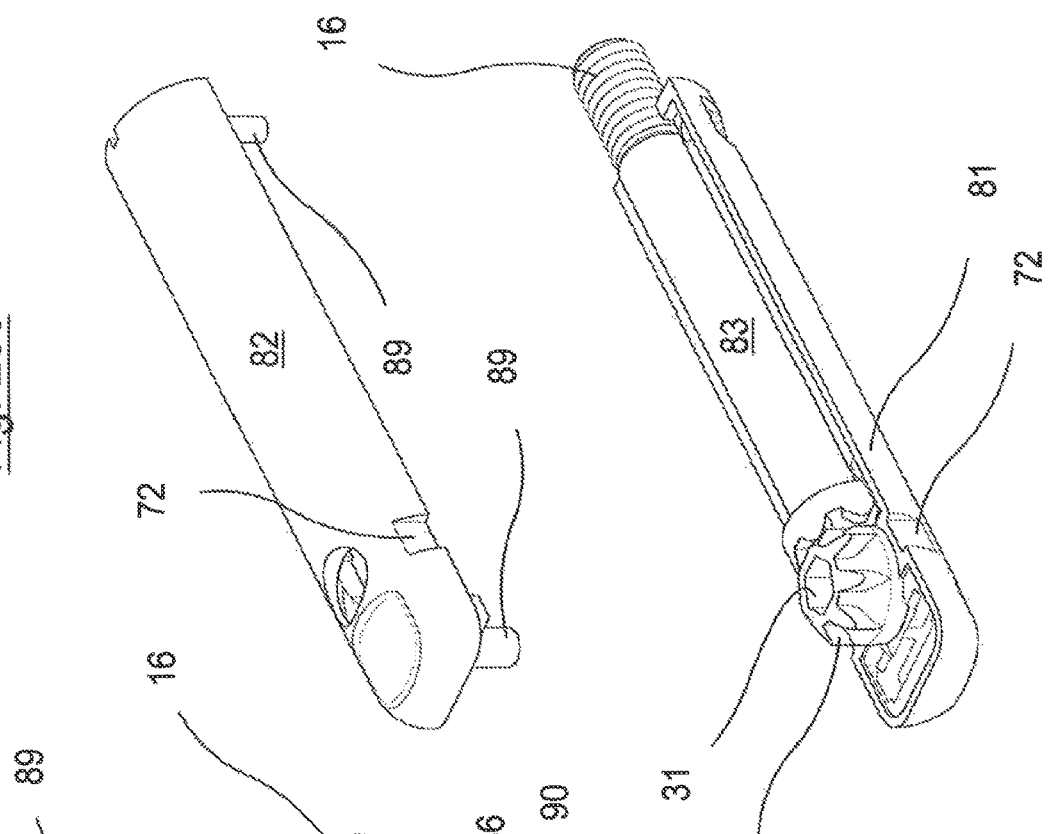
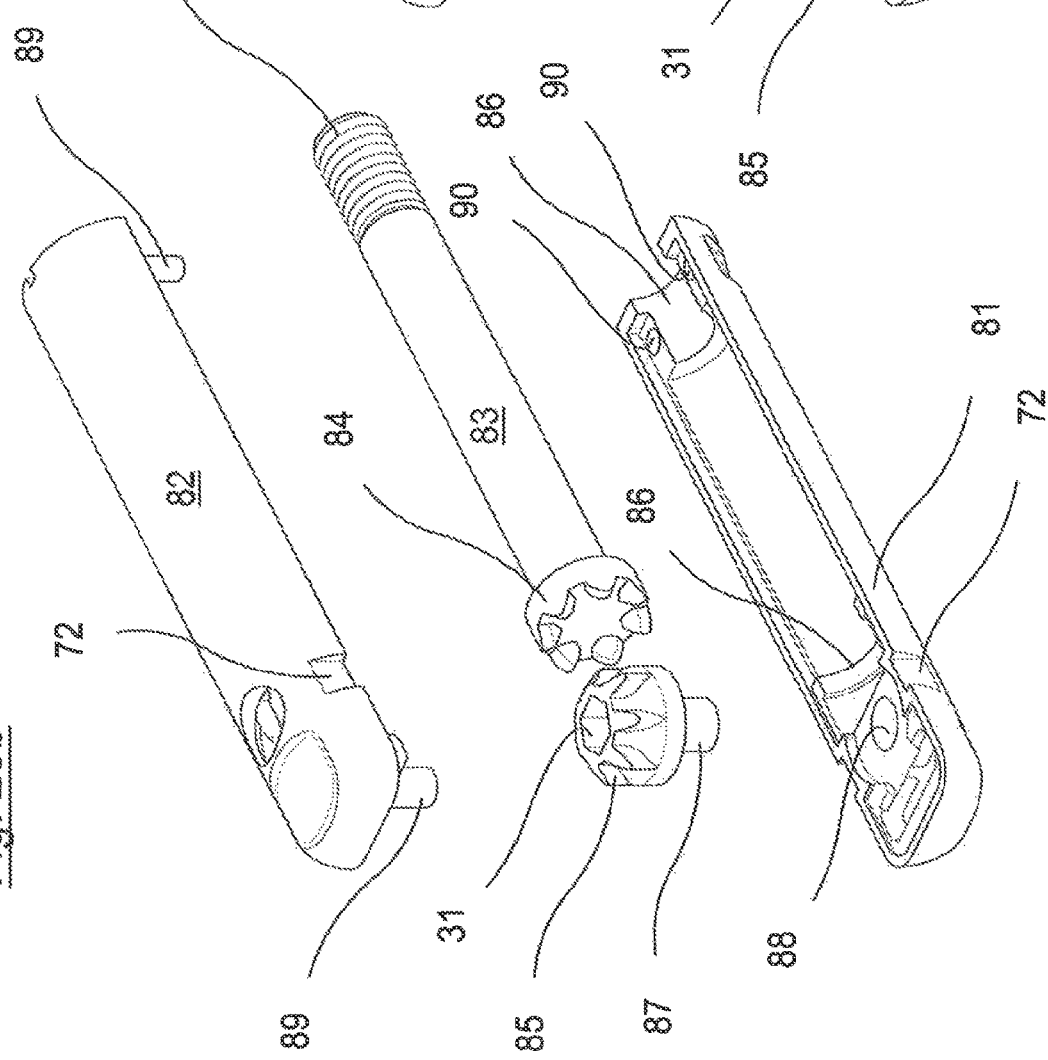
Fig. 25b
Fig. 25c

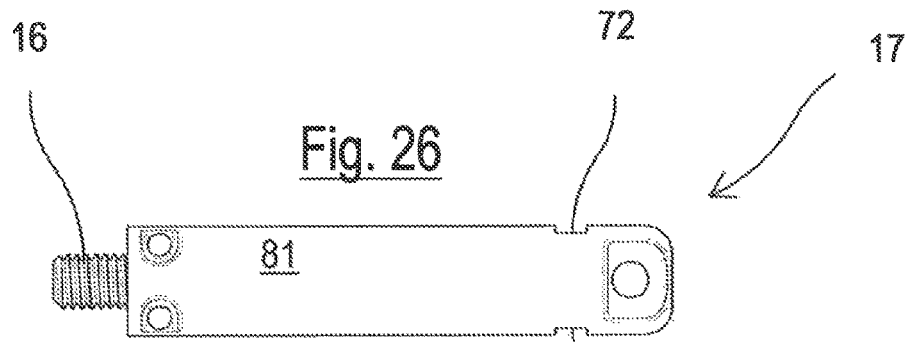
Fig. 26
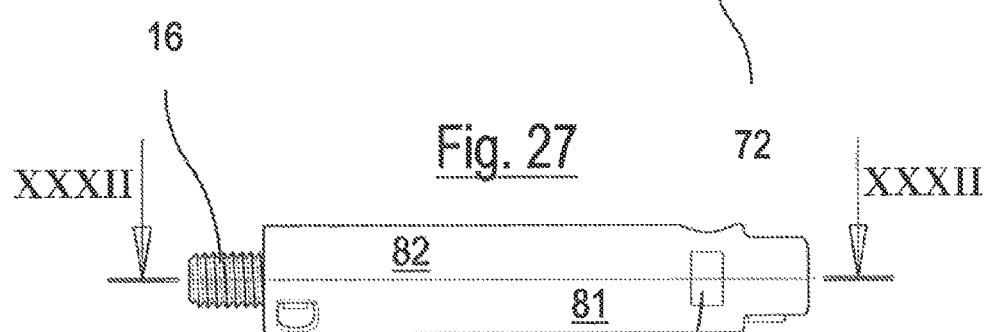
Fig. 27
Fig. 30    Fig. 31
Fig. 28
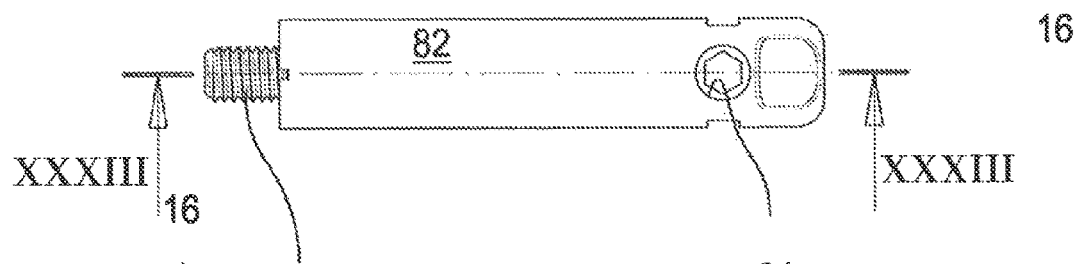
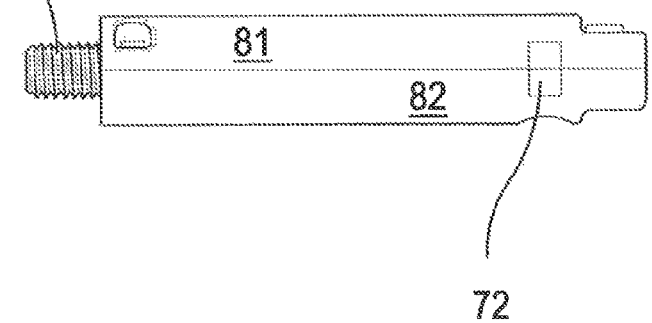
Fig. 29

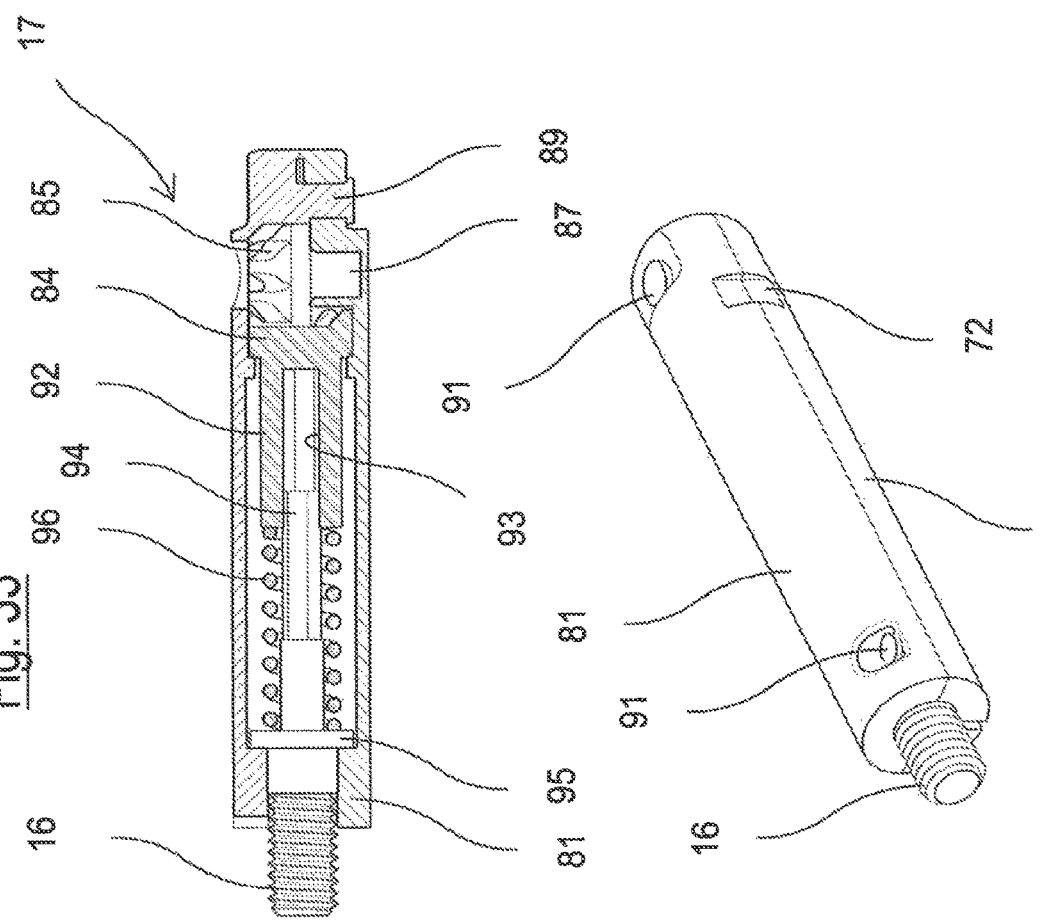
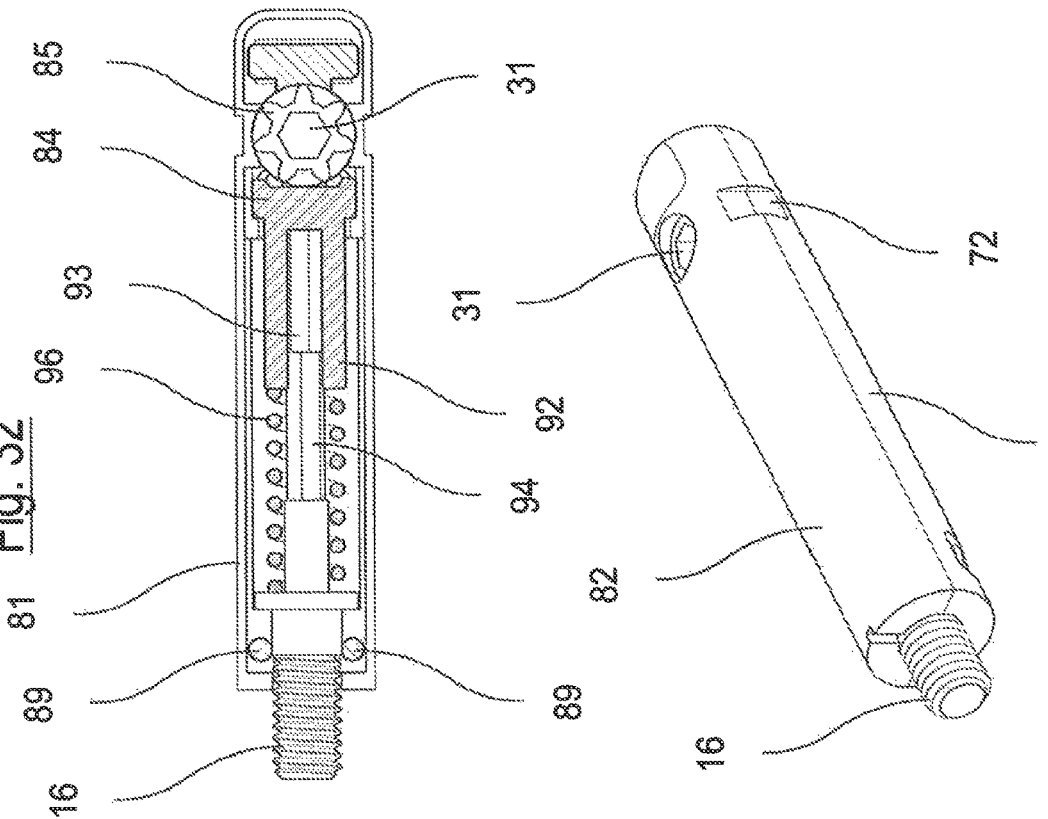

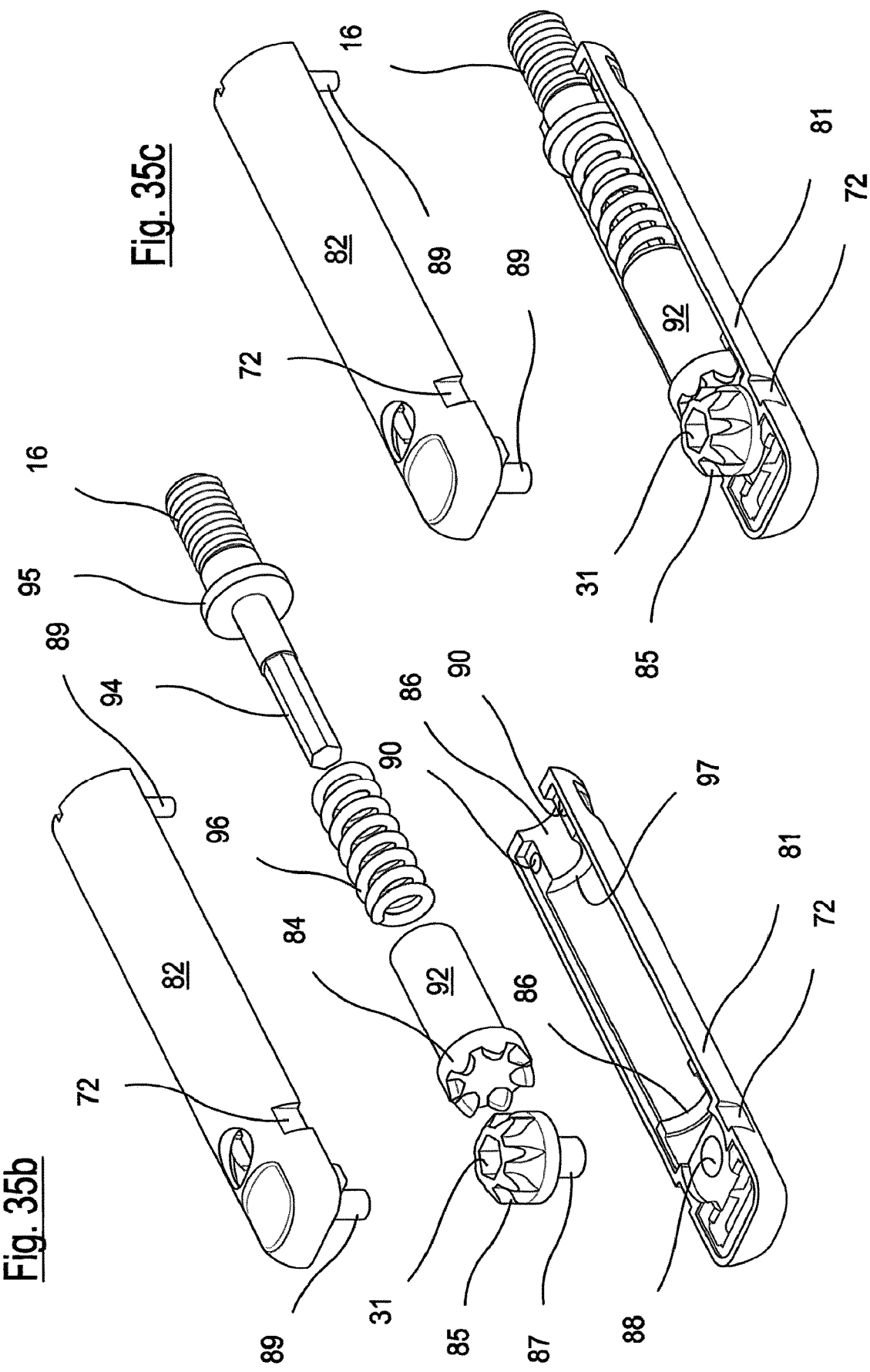

ACTUATION AND BLOCKING SYSTEM OF A JOINT BETWEEN A SHOULDER AND A SHELF OF A PIECE OF FURNITURE OR OTHER FURNISHING ITEMS

The present invention relates to a system for actuating and blocking a joint between a shoulder and a shelf of a piece of furniture or other furnishing items.

Various types of blocking systems are known between panels of furniture and other furnishing items, for example, in particular between a shoulder and a shelf. In this description, the generic term "shelf" refers to a base, a top or any intermediate shelf of a piece of furniture.

The actuation of blocking joints is effected in numerous ways and with a wide variety of devices, well known to skilled persons in the field. In general, however, a connection group and a blocking group are included which, by interacting with each other, ensure a stable positioning between the parts. The actuation of these groups takes place between the parts of the furniture itself, from below, from above, etc. depending on the specific requests and requirements.

Both the final aesthetic aspects of the furniture or the like, when assembled, and also the aspects relating to the assembly of the parts are, in fact, important.

In some of these applications, the parts of the furniture or furnishing item can be positioned in extremely narrow spaces both in height and in width with difficulty for the joining operations between the shoulders and shelves.

A particular condition is that in which the piece of furniture must be arranged in a recess with an extremely limited space between the shoulders and the side walls parallel to said shoulders.

For these specific cases, solutions have been studied and used that are quite suitable, but which involve both assembly problems and problems having a particular construction complexity that make them on the one hand expensive, and on the other hand delicate not always functioning satisfactorily.

The general objective of the present invention is therefore to provide a system for actuating and blocking a joint between a shoulder and a shelf of furniture or other furnishing items which is capable of solving the above-mentioned drawbacks of the known art in a simple, economical and functional manner.

A further objective of the present invention is to provide a joining system between two panels which also has a minimum encumbrance, although being easily accessible from extremely minimal spaces between the floor and piece of furniture or furnishing item or between the top and the ceiling, or even between the shoulders and side walls of the recess in which it must be positioned and mounted.

Another objective of the present invention is to provide a joining system which can be used between both shoulder and base or shelf, and also between shoulder and top.

The above objectives are achieved by a system for actuating and blocking a joint between a shoulder and a shelf of furniture or other furnishing items produced according to independent claim 1 and the following subordinate claims.

The structural and functional characteristics of the present invention and its advantages with respect to the known art will appear even more evident from the following description, referring to the attached schematic drawings, which show embodiment examples of the same invention all having the same innovative concept. In the drawings:

FIGS. 6b and 6c show in a perspective view the actuation and blocking unit alone, according to two different directions, whereas FIGS. 7b and 7c show the same group with parts exploded according to two different or opposite directions;

FIGS. 8 to 11 show a raised side view of the group of FIGS. 6b and 6c according to four different directions;

FIGS. 12 and 13 show the group of FIGS. 6b and 6c in views from above and from below respectively;

FIG. 14 is a raised sectional view according to the line XIV-XIV of FIG. 8;

FIG. 15 is a raised sectional view according to the line XV-XV of FIG. 11;

FIGS. 16 to 19 show a first embodiment of a pin of the system of the present invention in a raised side view according to four different directions;

FIGS. 20 and 21 show the pin of FIGS. 16 to 19 in views from one end and from the other end respectively;

FIG. 22 is a raised sectional view according to the line XXII-XXII of FIG. 17;

FIG. 23 is a raised sectional view according to the line XXIII-XXIII of FIG. 18;

FIGS. 24b and 24c show in a perspective view, the single pin of FIGS. 16-23 of the system of the present invention according two different directions, whereas FIGS. 25b and 25c show the same pin with parts exploded and partially assembled;

FIGS. 26 to 29 show a second embodiment of a pin of the system of the present invention in a raised side view according to four different directions;

FIGS. 30 and 31 show the pin of FIGS. 26 to 29 in views from one end and from the other end respectively;

FIG. 32 is a raised sectional view according to the line XXXII-XXXII of FIG. 27;

FIG. 33 is a raised sectional view according to the line XXXIII-XXXIII of FIG. 28;

FIGS. 34b and 34c show in a perspective view, the single pin of FIGS. 26-33 of the system of the present invention in two different directions, whereas FIGS. 35b and 35c show the same pin with parts exploded and partially assembled.

With reference in general to the figures and to the present invention, an improved system is shown, for the actuation and blocking of a joint G between at least one shoulder 11 and a base or a top 12, or shelf if necessary, of furniture or other furnishing items in general.

Figure 1:
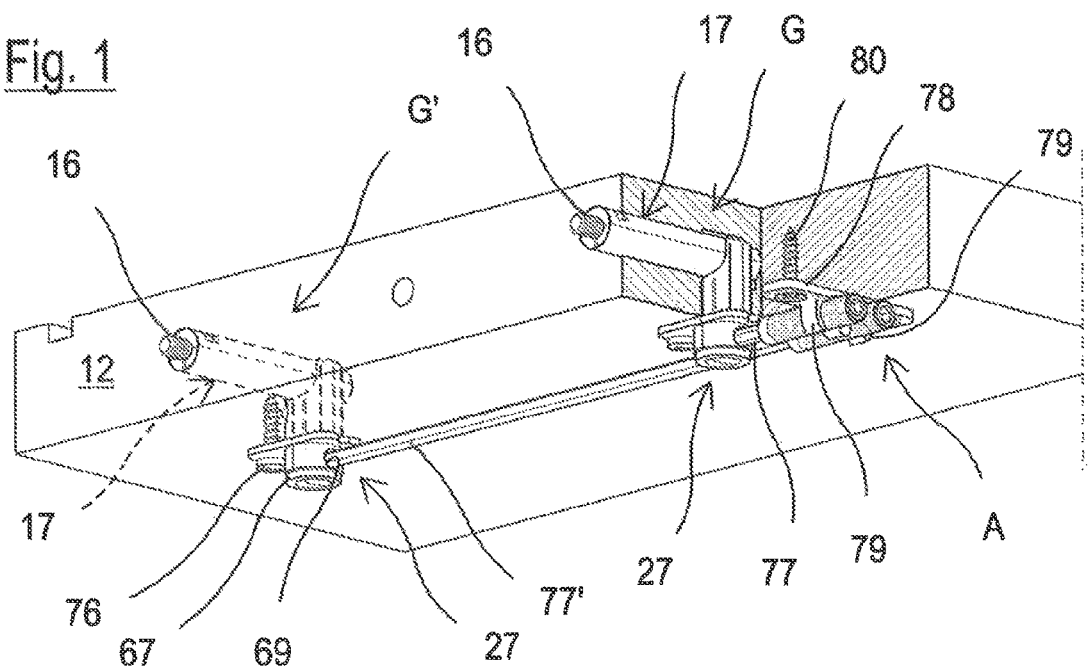
FIG. 1 is a partially split perspective view of a bottom or top of a piece of furniture equipped with an actuation and blocking system of a joint of furniture or other furnishing items produced according to the invention.
Figure 1B:
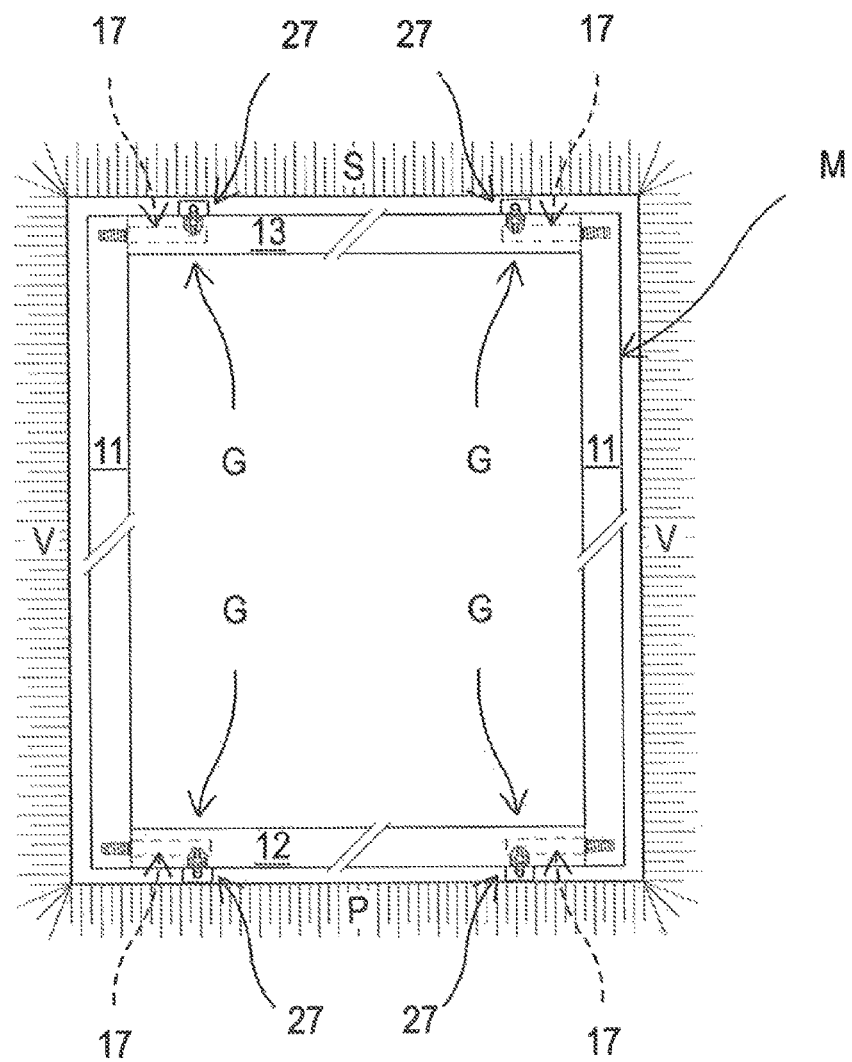
FIG. 1b is a raised view schematically illustrating a piece of furniture housed within a recess of a wall.

FIGS. 1 and 1b in particular illustrate, by means of a partially split perspective view, an actuation and blocking system of a joint of furniture or other furnishing items produced according to the invention when applied to a bottom 12 or top 13 of a piece of furniture. In particular, the scheme of FIG. 1b shows how such a system is particularly suitable for being applied and used for a piece of furniture M, shown in its shoulders 11 and also in a base 12 and a top 13, which must be housed between a floor P and a ceiling S very close to the furniture M when mounted, but above all between vertical walls V of a recess of a living or office space.

The base 12 and the top 13, and any other intermediate shelf (not shown in FIG. 1) are made firmly integral with each other thanks to a series of joints G connected to actuation and blocking groups 27 of the single joint forming an improved system according to the invention.

Figure 2:
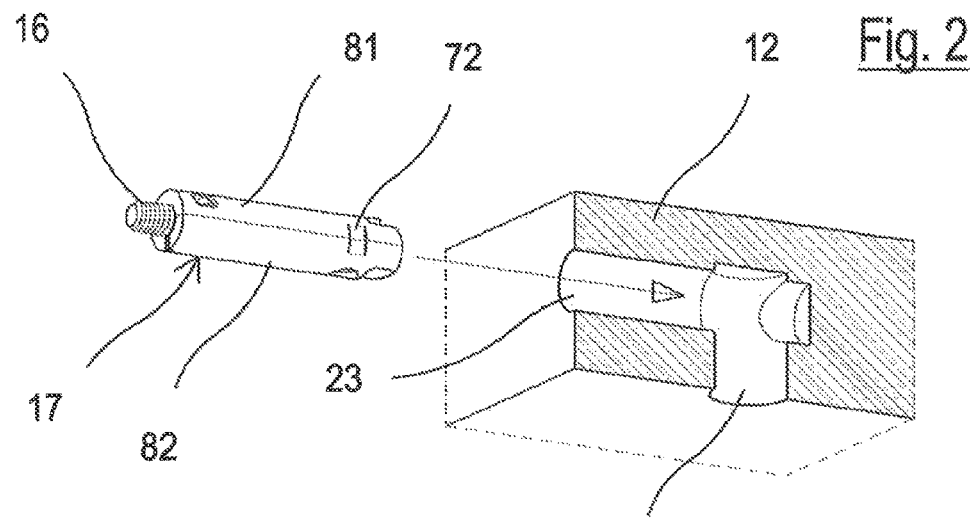
FIGS. 2 to 4 are perspective views of an assembly sequence of a pin with an actuation group to provide an actuation system according to the invention and FIGS. 3b and 4b show sections of FIGS. 3 and 4 one from above.
Figure 3:
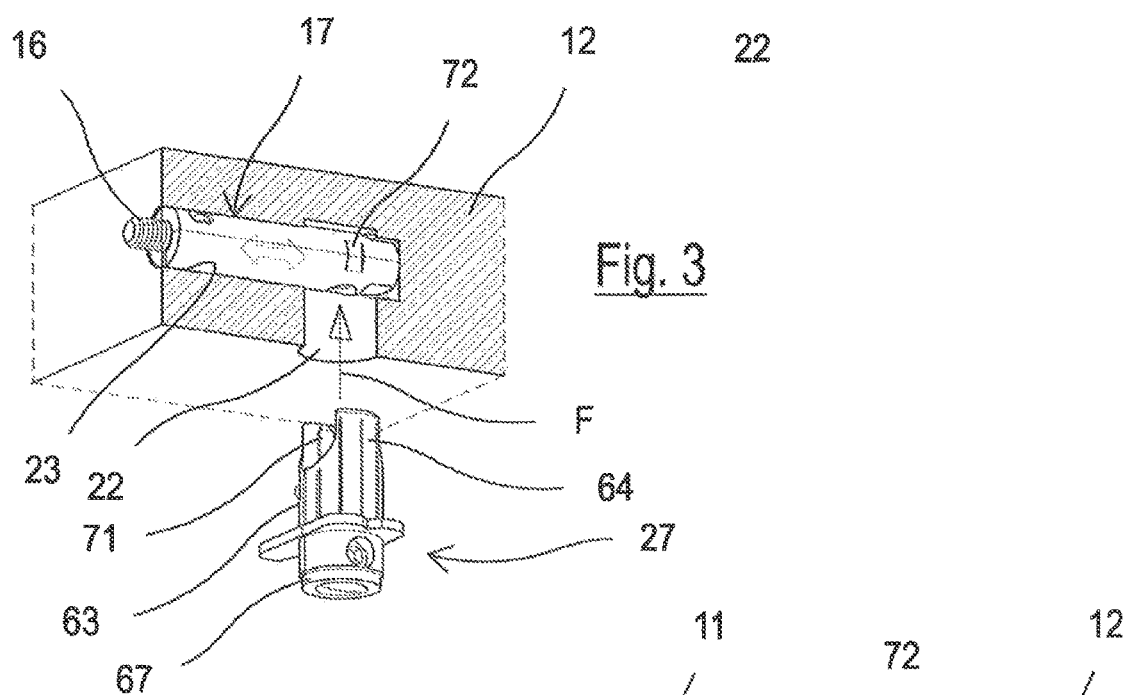
Figure 4B:
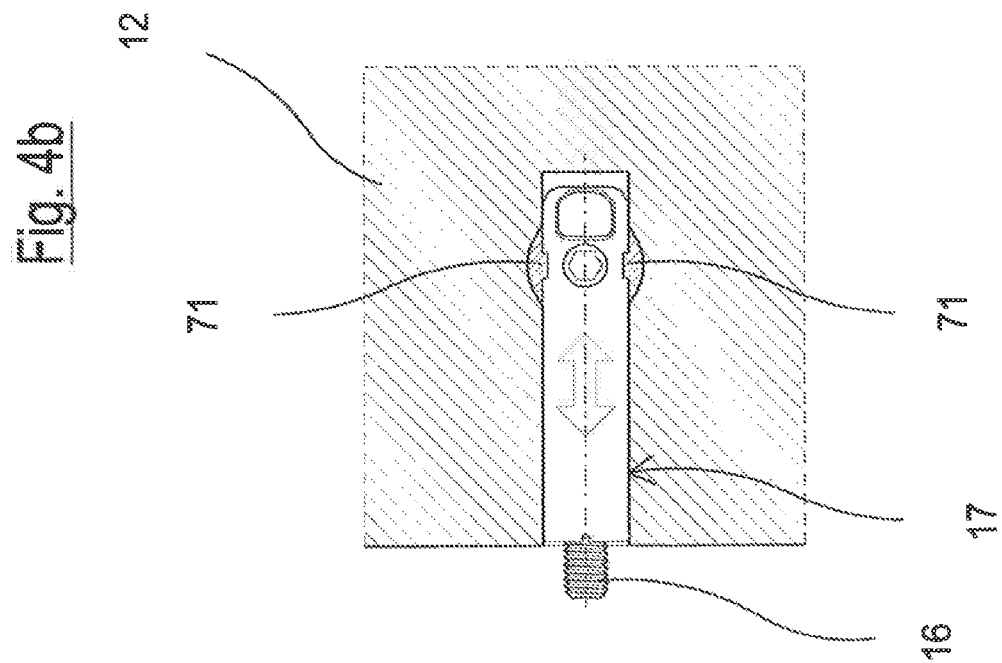
Figure 4:
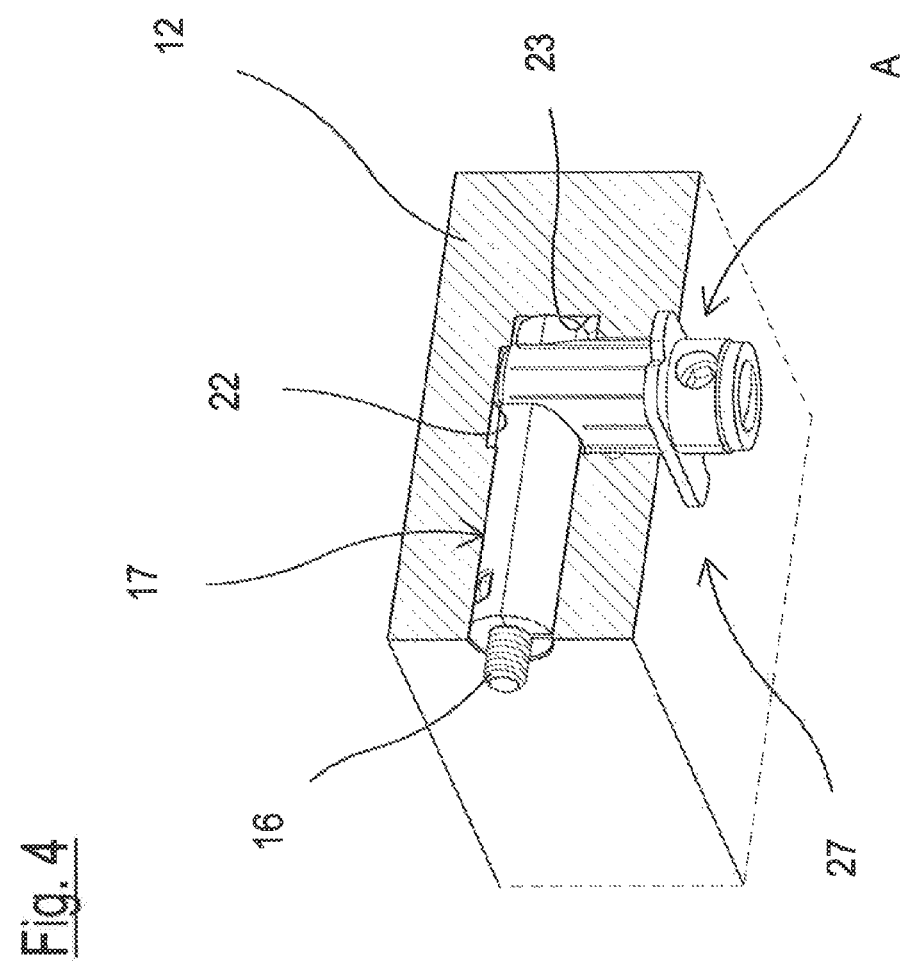

FIGS. 2 to 4 also show, for example, that a shoulder 11 has a horizontal blind hole 14 which defines a seat in which an internally threaded bush 15 is positioned for receiving a threaded end 16 of a pin, indicated as a whole as 17. Alternatively the threaded end 16 of the pin 17 is screwed directly into the blind hole 14.

The pin 17 is positioned in an internal hole 23 obtained in the base 12 or in the top 13 of the furniture, to be aligned with the blind hole 14 of the shoulder 11. The hole 23 of the base 12 or top 13 crosses with, and intersects a further hole 22, formed in a direction perpendicular to the first hole 23 mentioned above.

This further hole 22 is actually produced for receiving an upper part of the actuation and blocking group 27 of the single joint G.

In this hole 22, there is an upper extension of a shaped body 61, 62 of an actuation and blocking group 27 of the joint forming part of the system of the present invention.

The shaped body 61, 62, produced in two halves (FIGS. 7b and 7c), of the actuation and blocking group of the joint 27 is inserted from below the base 12 (in the example of FIGS. 2-4) or from above the top 13 to cross the pin 17.

The base 12, or the top 13, as seen from FIG. 1b, are parallel to the floor P or to the ceiling S, wherein the floor P or the ceiling S are both close to the piece of furniture or other furnishing item M when mounted, as is clearly shown in FIGS. 1, 1b. The shoulders 11 of the piece of furniture are close to the vertical walls V of the recess or other type of space.

The upper extension of the shaped body 61, 62 of an actuation and blocking group of the joint 27 is formed by respective hollow appendages 63, 64 which are internally rounded in surfaces facing each other and such as to at least partially embrace, when assembled, the outer surface of the respective pin 17.

These appendages 63, 64 therefore create retention means which firmly and reciprocally block the pin 17 and the actuation and blocking group of the joint 27, between them. In particular, these appendages 63, 64 may have a certain yielding and elasticity so as to form a snap-engagement between the parts.

As can be seen from the figures, the actuation and blocking group 27 of the joint G comprises a 90° transmission accessible from the front with respect to the furniture, in a maneuvering or actuation point, indicated by A. The actuation and blocking group of the joint 27 comprises, in fact, a pinion-toothed crown bevel gear inside the body 61, 62.

The actuation and blocking group of the joint 27 therefore comprises a kinematic actuation mechanism for rotating the threaded end 16 of the pin 17 suitable for being screwed into a bush 15 or in any case into a hole 14 of the shoulder 11.

More specifically, in a lower housing 65, 66 formed in the body 61, 62, a pinion 28 is free to rotate, which comprises a seat 29 for receiving a tool (not shown) in the actuation point A, which is facing the front of the furniture M.

A toothed crown 39, formed as the head of a stem 30 with a shaped free end 31b, engages with the above-mentioned pinion 28.

The shaped end 30b of the stem 30 is inserted into a hole of the pin 17 engaging to effect the functioning of the joint G.

Once the parts have been positioned inside the actuation and blocking group of the joint 27, a clamping ring 67 is arranged to block together the two parts 61, 62 forming the body (see FIGS. 7b, 7c and 6b, 6c) in portions with a smaller diameter at the lower ends of the two parts 61, 62. The part 62 of the body comprises in a lower lateral position, a pass-through hole 69 for a tool which actuates the pinion 28 in rotation.

Furthermore, the parts of the body 61, 62 of the actuation and blocking group of the joint 27 are reciprocally associated through centering pins 68 of one part 62 which are housed in blind holes 70 of the other part 61 of the body.

FIGS. 2 to 5 show how the above-mentioned parts of the system are arranged, bearing in mind that inside the appendages 63, 64, hollowed and internally rounded keyway extensions 71 are provided, suitable for being inserted in hollow grooves 72 formed outside the body of the pin 17.

In this way, retention means are created which firmly block the pin 17 and the actuation and blocking group of the joint 27 between them, almost automatically.

Furthermore, both parts of the body 61, 62 of the actuation and blocking group of the joint 27 comprise radial extensions in the form of flanges 73 and 74 which are arranged in abutment below the base 12 or above the top 13 in an operative position.

In particular, at least one of the two radial flanged extensions 73 comprises a pass-through seat 75 for receiving a fixing screw 76 of the actuation and blocking group of the joint 27, once inserted in the hole 22 of the base 12 or top 13.

As shown in FIG. 1, an example is provided in which a front joint G and a rear joint G' are represented and wherein further optional arrangements are included which facilitate the actuation of the joints G, G'.

A transmission and actuation rod 77 is in fact first included for transmitting rotation on the rear joint G'. It can be noted that said transmission and actuation rod 77, at one of its ends, penetrates the pass-through hole 69 so as to be engaged in the actuation seat 29 of the pinion 28 of the rear joint G'.

A further shorter transmission and actuation rod 77' can also be included, which is inserted into the pass-through hole 69 of the front joint G so as to be engaged in the actuation seat 29 of the pinion 28 of the front joint G itself. Furthermore, a bracket 78 can be included, provided with elastic supports 79, C-shaped and open towards the bottom, which house, free to rotate, both of said transmission and actuation rods 77, 77' facilitating their actuation. The bracket 78 can be fixed to the base or bottom 12 or to the top 13 by means of screws 80.

It should also be noted that the pin 17 shown in FIGS. 1 to 5 is shown in a first embodiment also illustrated in FIGS. 16 to 25c.

Said pin 17 comprises a pair of half-shells 81, 82 having a hemi-cylindrical form, suitable for being housed in the hole 23, when joined together to form a casing. Inside, the half-shells 81, 82 of the casing are partially hollow and house, free to rotate, a stem 83 terminating on one side in the threaded end 16. A toothed crown 84, formed as head of the stem 83, is integral with the other end of the stem 83, which engages with a pinion 85. The toothed crown 84 and the pinion form a pinion-toothed crown bevel gear defining a 90° transmission which receives the shaped end 30b of the stem 30.

The pin 17 therefore also comprises a kinematic actuation mechanism for rotating the threaded end 16.

Said shaped end 30b of the stem 30 is in fact inserted in the shaped hole or seat 31 formed in the above-mentioned pinion 85 of this further bevel gear arranged inside the pin 17.

It is therefore evident that by acting with a tool (not shown) or through the transmission and actuation rods 77, 77' on the pinions 28 of the two actuation and blocking groups of the joint 27 of the front joint G and a rear joint G', the rotation of the stems 83 is promoted together with the screwing of the threaded ends 16 into the blind holes 14 of the shoulder or shoulders 11.

The presence of two bevel gears facilitates this positioning operation of shoulders integral with a base 12 and/or top 13 of a piece of furniture in a recess such as that shown in FIG. 1b.

Figure 5:
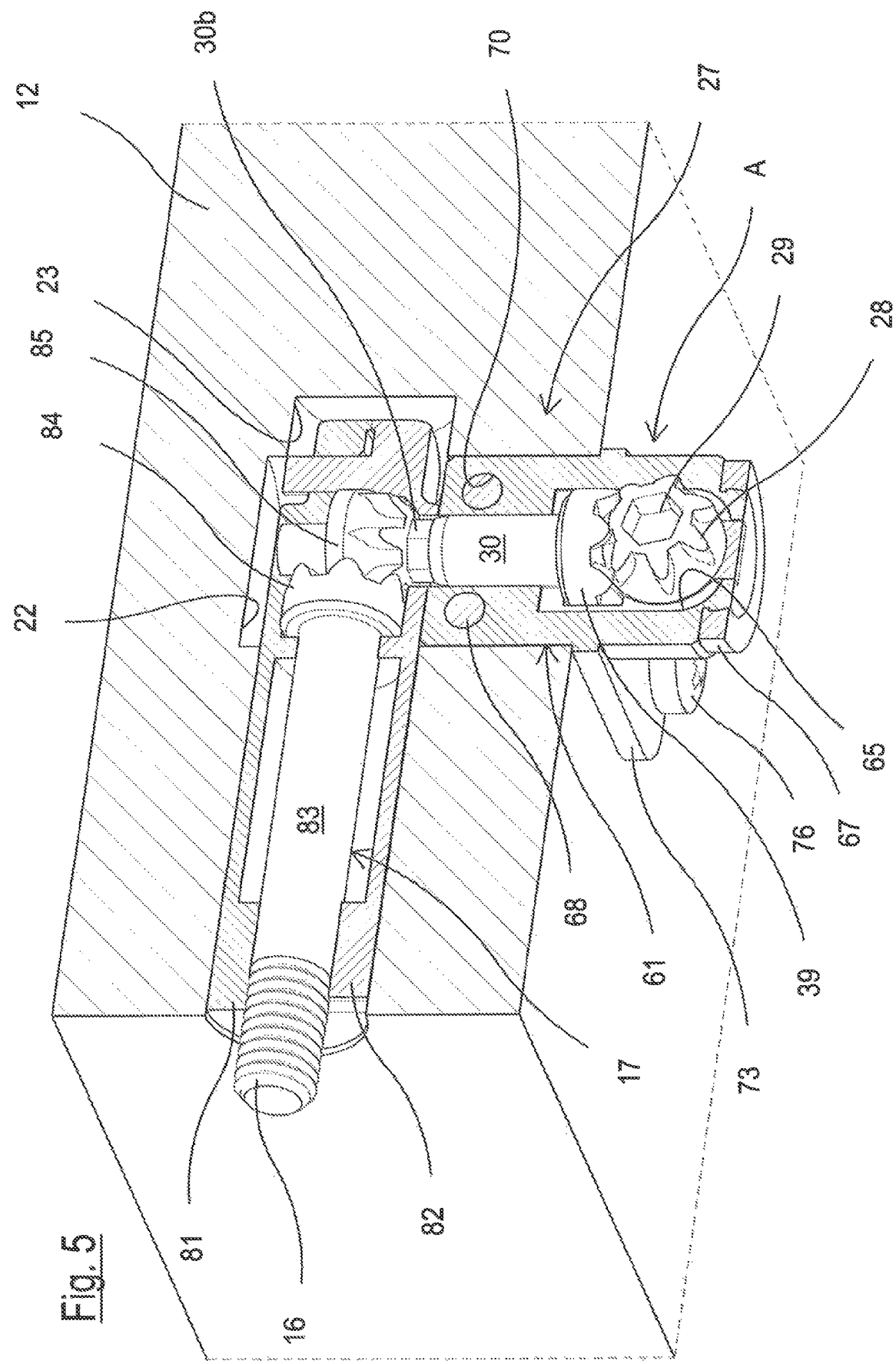
FIG. 5 shows a view similar to that of FIG. 4 split and sectioned.

FIG. 5 shows what has just been described and FIGS. 16 to 25c show this first embodiment of the pin 17 in detail.

These latter detailed figures allow a better appreciation of the parts constituting the pin 17.

In particular, it can be seen that the stem 83 is housed on supporting seats 86 inside the two half-shells 81, 82 and also a pin 87 of the pinion 85 finds is housed rotating in a seat 88 of the half-shell 81.

The two half-shells 81,82 are joined by centering plugs 89 of a half-shell 82 which are arranged and housed in pass-through holes 90 and are riveted in 91 to block the parts together.

The hollow grooves 72 formed externally to the body of the pin 17 are half in each of the two half-shells 81, 82 when aligned and joined together.

Finally it should be pointed out that the pin 17 can be in a second embodiment illustrated in FIGS. 26 to 35c with a retractable threaded end 16 as can be seen hereunder.

The same or extremely similar elements are indicated with the same reference numbers.

Also in this case there are therefore two half-shells 81, 82 which contain the pinion-toothed crown bevel gear defining a 90° transmission which receives the shaped end 30b of the stem 30 of the actuation and blocking group 27 of the single joint G,G'.

The pinion 85 is positioned as in the first example, whereas the toothed crown 84 is arranged at one end of a stem 92 internally provided with a cavity 93. An end of a rod 94 is free to slide in the cavity 93, which, in an intermediate portion, provides a radial flange 95 projecting outwardly. The other end of the rod 94 is threaded in 16 as in the previous example. A compression spring 96 is arranged between the radial flange 95 and the end of the stem 92, which, in rest position, keeps the threaded end 16 of the rod 94 protruding from the half-shells 81, 82. The flange 95 also acts as a contrast to the extension of the spring 96 as it is abutted against stops 97 formed in the internal cavities of the half-shells 81, 82.

It can be understood that the provision of the spring 96 allows the threaded end 16 to return into the two half-shells 81, 82 of the pin 17 facilitating the coupling between the bottom 12 or the top 13 and shoulders 11 even in extremely narrow spaces.

The functioning is completely intuitive and is not described in detail due to the clarity of the figures.

It can be observed from the examples described and illustrated, that with an improved actuation and blocking system of a joint between a shoulder and a shelf, the bottom or top of a piece of furniture or other furnishing items according to the invention, comprising an actuation and blocking group of the joint 27, this can be positioned very easily, even in extremely narrow spaces.

Once the necessary holes 22 and 23 have been formed in the bottom 12 or top 13, in fact, both the joining pin 17 and the actuation and blocking group 27 of the joint G,G' can be immediately positioned.

FIGS. 2 to 5 show these operations as they are effected.

Figure 3B:
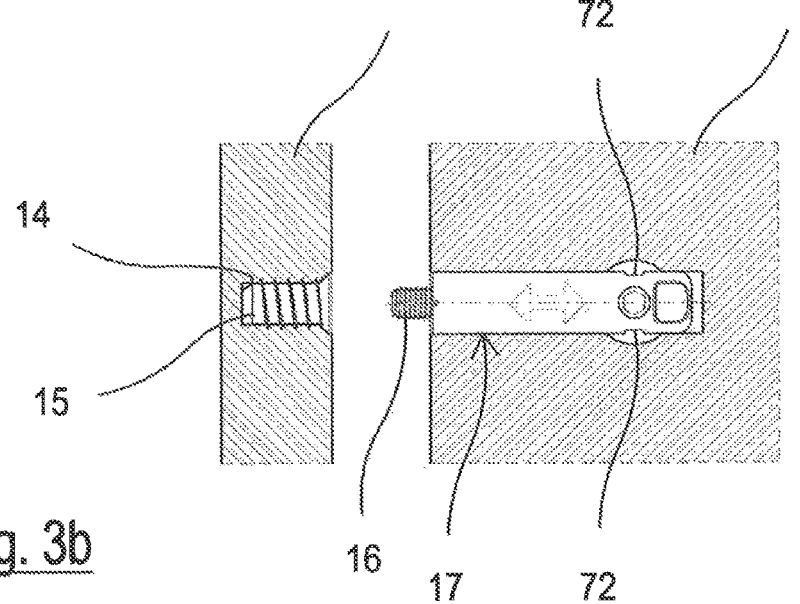

Both the pin 17 and the actuation and blocking group 27 are in fact prepared. The pin 17 is inserted in the relative hole 23 so that the hollow grooves 72 formed externally to the body of the pin 17 are on the sides of the same inside the hole 22, as shown in FIGS. 3 and 3b.

The actuation and blocking group 27 of the joint is then inserted according to the arrow F of FIG. 3 is inserted until it reaches the completely inserted position shown in FIG. 4 and in FIG. 4b.

This position, i.e. the stable blocking between the actuation and blocking group 27 and the joining pin 17 is easily and certainly effected due to the presence of the hollow and internally rounded appendages 63, 64 which at least partially embrace the outer surface of the pin 17, when assembled. The keyway extensions 71 arranged inside the appendages 63, 64 are inserted in the hollow grooves 72 formed externally to the body of the pin 17, blocking the parts together and ensuring a secure reciprocal positioning.

In this way, retention means are activated which automatically firmly block the pin 17 and the actuation and blocking group of the joint 27.

If the pin is according to FIG. 5 in its first embodiment, there must be the minimum space for aligning the threaded end 16 of the pin 17, contained in the base 12 or top 13, with the hole 14 included in the shoulder 11.

The threaded end 16 of the pin 17 in the hole 14 is then rotated by means of the actuation and blocking group 27 of the joint and the two bevel gears, which are arranged both within the group 27 and the pin 17.

This rotation allows the base 12 or top 13 and shoulder 11 to be moved together and tightend, obtaining the blocking and complete tightening between the parts.

If the space for positioning the piece of furniture is extremely narrow, and such that it is not possible to act with the axially fixed threaded end 16, protruding from the bottom 12 or top 13 as in FIG. 5, the second embodiment previously illustrated can be used, according to FIGS. 26 to 35c with a retractable threaded end 16, axially movable within the body of the pin.

In this case it is possible to act with a tool or the like for holding the threaded end 16 so that it does not protrude from the bottom 12 or top 13 and bringing the bottom 12 or top 13 in line with the shoulder 11.

Subsequently, when the threaded end 16 is aligned with the hole 14 formed in the shoulder 11, it is possible to act as previously described and proceed with screwing the threaded end 16 into the hole 14 of the shoulder 11.

It can be noted that it is always possible to act from the front of the furniture also thanks to the presence of the actuation and blocking group 27 of the joint.

It can be seen how a retractable threaded end or a fixed threaded end can be included in the system of the present invention.

It can thus be noted that a system according to the invention is extremely simple and functional.

Said actuation system, moreover, is frontal and can be positioned in extremely minimal spaces between furniture and floor or ceiling and side walls of a recess.

Furthermore, as shown for example in FIG. 1, for the rear joints G' of the furniture M (but also for the front joints G), actuation and transmission rods of the motion 77, 77' can be included, arranged as previously described and illustrated.

The forms and structure for implementing a system according to the present invention, as also the materials and assembly modes, can naturally differ from those shown as a non-limiting example in the drawings.

The objectives mentioned in the preamble of the description have thus been achieved.

The protection scope of the present invention is defined by the enclosed claims.

The invention claimed is:

1. An actuation and blocking system of a joint configured for joining a shoulder and a shelf, base or top of a piece of furniture or other furnishing item perpendicularly to each other, said actuation and blocking system comprising:
   a pin having a fixing element shaped as a threaded end configured to be received in the shoulder, wherein the pin is configured to be at least partially inserted in a hole defined in the shelf, base or top, the pin comprising a casing that houses a first stem coupled to a first pinion-toothed crown bevel gear assembly that defines a first 90° transmission, the first pinion-toothed crown bevel gear assembly comprising a first pinion and a first toothed crown bevel gear having longitudinal axes arranged perpendicularly to define the first 90° transmission, which operates as a kinematic adjustment mechanism for rotating the threaded end of the pin; and
   an actuation and blocking group of the joint arranged perpendicularly to the pin and comprising:
   a second stem adapted to be inserted into a side hole of said casing, said second stem extending from the actuation and blocking group, wherein a shaped end of the second stem is configured to be received in the first 90° transmission; and
   a second 90° transmission between a maneuvering point, which is configured to be accessible from a front of the piece of furniture and said second stem,
   wherein the second 90° transmission is defined by a second pinion-toothed crown bevel gear assembly that comprises a second pinion and a second toothed crown bevel gear having longitudinal axes arranged perpendicularly to one another, and
   wherein retention elements are provided between said pin and said actuation and blocking group, the retention elements being configured to engage the pin to the actuation and blocking group.

2. The actuation and blocking system according to claim 1, wherein said retention elements are reciprocal blocking elements between said pin and said actuation and blocking group when said actuation and blocking group is configured to be inserted in the hole defined in the shelf, base or top which houses said pin.

3. The actuation and blocking system according to claim 1, wherein said retention elements are of a yielding or elastic type.

4. The actuation and blocking system according to claim 1, wherein said retention elements are of a snap type.

5. The actuation and blocking system according to claim 1, wherein said retention elements are appendages of a body of said actuation and blocking group, which are engaged on said pin.

6. The actuation and blocking system according to claim 5, wherein said appendages are recessed and internally rounded in surfaces facing each other such as to at least partially embrace, when mounted, an outer surface of the pin.

7. The actuation and blocking system according to claim 5, wherein said appendages are engaged in hollow grooves formed externally to a body of said pin.

8. The actuation and blocking system according to claim 7, wherein said appendages provide keyway extensions facing each other and configured to be inserted in said hollow grooves in the body of the pin.

9. The actuation and blocking system according to claim 1, wherein said pin is of a fixed type.

10. The actuation and blocking system according to claim 1, wherein said pin is of a retractable type.

11. The actuation and blocking system according to claim 1, wherein said pin and said actuation and blocking group are arranged in a direction perpendicular to each other.

12. The actuation and blocking system according to claim 1, wherein said casing comprises a pair of hemi-cylindrical half-shells, configured to be housed in the hole defined in said shelf, base or top.

13. The actuation and blocking system according to claim 1, wherein the first pinion-toothed crown bevel gear assembly is positioned to be free to rotate in said casing and the first crown bevel gear is arranged at a first end of the first stem, the first stem being internally provided with a cavity, wherein a first end of a rod is free to slide in said cavity, the rod, in an intermediate portion, having a radial flange projecting outwardly, a second end of the rod comprising the threaded end, a spring being positioned between said radial flange and said first end of the first stem, which, in rest position, keeps said second end protruding from the casing, said radial flange acting as a contrast to an extension of the spring and abutting against stops formed inside said casing.

* * * * *